Feb. 28, 1967 G. RIEDMAYR 3,307,082

SWITCHING ARRANGEMENT

Filed Dec. 1, 1964

3 Sheets-Sheet 1

INVENTOR.
GEORG RIEDMAYR

BY

Michael J. Striker
ATTORNEY

Feb. 28, 1967 G. RIEDMAYR 3,307,082

SWITCHING ARRANGEMENT

Filed Dec. 1, 1964

3 Sheets-Sheet 2

INVENTOR.
GEORG RIEDMAYR
BY
Michael S. Striker
ATTORNEY

Feb. 28, 1967 G. RIEDMAYR 3,307,082

SWITCHING ARRANGEMENT

Filed Dec. 1, 1964 3 Sheets-Sheet 3

Inventor:
Georg Riedmayr
BY Michael J. Striker
his ATTORNEY

United States Patent Office 3,307,082
Patented Feb. 28, 1967

3,307,082
SWITCHING ARRANGEMENT
Georg Reidmayr, Munich, Germany, assignor to Carl Murth Maschinen- und Zahnradfabrik, Munich, Germany
Filed Dec. 1, 1964, Ser. No. 416,959
Claims priority, application Germany, Jan. 8, 1963, H 47,897; Dec. 4, 1963, H 51,024
9 Claims. (Cl. 317—148.5)

The present invention concerns switching arrangements, and more particularly switching arrangements which are exceptionally well suited for being used for the control of machine tools.

The present invention is a continuation-in-part application of my copending application Serial No. 336,199, filed January 7, 1964 and entitled "Switching Arrangement," now abandoned.

Switching arrangements are known which operate without make-and-break contacts and are essentially based on the utilization of electron tubes as switching elements. Arrangements of this type are comparatively expensive and so sensitive that they are easily subject to failures or breakdowns in areas of rough operation e.g. machine shops which is the reason that they have not proven satisfactory and reliable in applications of this type. It is true that the introduction of transistors made it possible that many tasks of electron tubes in switching arrangements have been taken over by transistors whereby switching arrangements operating without make-and-break contacts have become less expensive and sturdier. However, such transistor equipped switching arrangements have still the disadvantage already known from the tube equipped switching arrangements namely the disadvantage of being capable of controlling only comparatively small amounts of power. In addition, each individual transistor element is capable of furnishing only one single output impulse.

It is, therefore, an object of this invention to provide for a switching arrangement which utilizes the advantages of transistors but avoids the above-mentioned disadvantages of the known transistor switching arrangements.

It is another object of this invention to provide for switching arrangements which are comparatively simple and entirely reliable in operation.

It is still another object of the invention to provide for a switching arrangement as set forth which is particularly advantageous in connection with the operation of machine tools.

It is a further object of this invention to provide for a switching arrangement in which it is possible to de-energize a relay by energizing an electronic circuit.

It is a further object of the invention to provide for a switching arrangement which permits a logical "OR"-switching action and an "AND"-switching action.

It is another object of the invention to provide for a stable electronic arrangement.

It is still another object of the invention to provide for a switching arrangement, which permits a constant signal size.

It is a further object of the invention to provide for a switching arrangement, which acts with a constant potential.

It is a further object of the invention to provide for a switching arrangement which can be favorably incorporated into any large circuit.

It is a further object of the invention to provide for electronic switching arrangements which permit galvanic isolation (insulation) from one another.

It is another object of the invention to provide for an electronic switching arrangement in which the de-energizing action or circuit predominates over the energizing action or circuit.

With the foregoing objects in view, the invention includes a switching arrangement comprising, in combination, electromagnetically operable switch means having a first circuit controlling position when in de-energized condition and a second different circuit controlling position when in energized condition; first electronic control means responsive to the application thereto of a predetermined control potential and connected to the electromagnetically operable switch means for energizing the latter when the predetermined control potential is applied to the first electronic control means; second electronic control means responsive to the application thereto of the predetermined control potential and connected to said first electronic control means for causing the latter to discontinue energizing said switch means as long as said predetermined control potential is applied both to said first and second electronic control means; and circuit means for energizing said switch means and for applying said control potential to said control means and connecting said first and second control means with each other and with said switch means.

It can be seen that the switching arrangement according to the invention essentially comprises an electromagnetically operable switch means e.g. a relay and electronic control means which operate entirely without make-and-break contacts and control the operation of the electromagnetically operable switch means. Consequently, the arrangement according to the invention yields the substantial advantage that the electronic control means which are essentially transistor means are used for controlling any desired number of contacts forming part of the electromagnetically operable switch means and which may belong to a plurality of circuits which are independent from each other. Thus it is for instance possible that a switching arrangement according to the invention is used for controlling even circuits carrying entirely different types of current e.g. direct current and alternating current, respectively. As far as the power is concerned which can be controlled by an arrangement according to the invention it will be seen that the advantage of electronic controls namely comparatively very small control current input is combined successfully with the advantages of electromagnetically controllable switches namely the possibility of controlling large amounts of power. Moreover, it is possible in this manner to combine a transistor equipped logical circuit with power controlling relay circuits. When a switching arrangement according to the invention is utilized in comparatively large pieces of equipment e.g. automatic machine tools, then the desire to have control circuits with as few make-and-break contacts as possible is met satisfactorily by controlling the unavoidable relays or relay switches by electronic controls so that in this manner the number of points of possible failure and the chances of failure or breakdown of the entire machine are greatly reduced and in the case of an occurring failure the finding of the point of breakdown is greatly facilitated.

The fact that a particular control potential input terminal and corresponding control circuit is provided for the purpose of de-energizing the controlled relay switch results in the advantage that the controlled circuit may be interrupted indirectly by the opening of a normally closed control contact. For instance, in a machine tool a relay may be kept for an extended period of time in circuit closing position while nevertheless this position may temporarily or suddenly, whenever desired, change to a circuit-opening position by the application of a control pulse to the above-mentioned control circuit. This may be of particular advantage in connection with safety devices.

It should be recognized also that in well known bi-stable control circuits the control is never as positive and reliable as in the case of the control circuit provided by the invention. In particular, in bi-stable control circuits containing transistors one is never sure which of two alternative positions the control circuit will assume at the moment when the supply voltage is applied thereto. Therefore a special setting impulse must be applied before the circuit can be operated. No such requirements are present when the switching arrangement according to the invention is put into operation.

As mentioned above the switching arrangement according to the invention may be used in cooperation with one or more logical circuits e.g. logical gates (AND or OR gates). Since such gate circuits are already provided with resistors of specific values it may be necessary in certain cases to omit determined ones of the input resistors normally provided between the control input terminals of the arrangement and the control transistors. However, an arrangement according to the invention is in the first place designed for being used as a control unit which can be assembled as a component within a larger unit e.g. a machine tool. Consequently such switching arrangements or units according to the invention may be used as a plurality thereof within one such machine tool. In order to make it possible to use a standard switching arrangement unit according to the invention in various places and various applications, an embodiment of the invention is characterized by an additional control input terminal which is connected with the corresponding control transistor directly and thus by-passing the normally provided input resistor. Such an arrangement detail may be provided both for the control potential input terminal through which the relay switch is energized and for the second control potential input terminal through which de-energization of the relay switch is effected. The above-mentioned logical circuits or gates may constitute separate units which are combined or assembled with the switch arrangement units according to the invention, or if desired the logical circuits or gates may even be assembled with a switching arrangement according to the invention in one assembly unit.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 3:
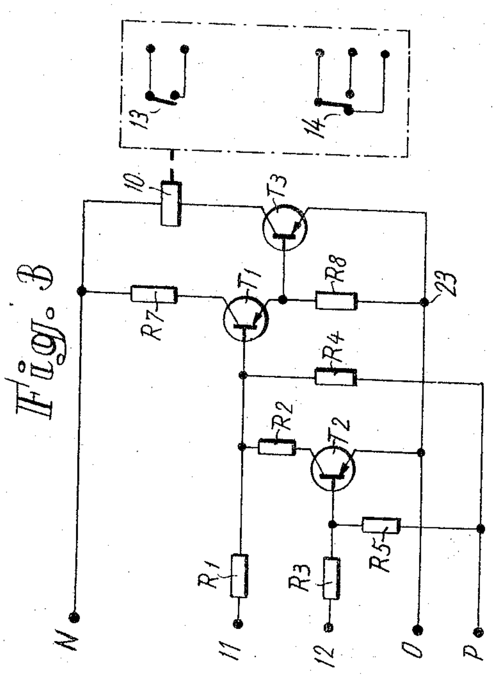
FIG. 3 is a similar diagram illustrating a further modification of the arrangement according to FIG. 1 but including amplification means.
Figure 4:
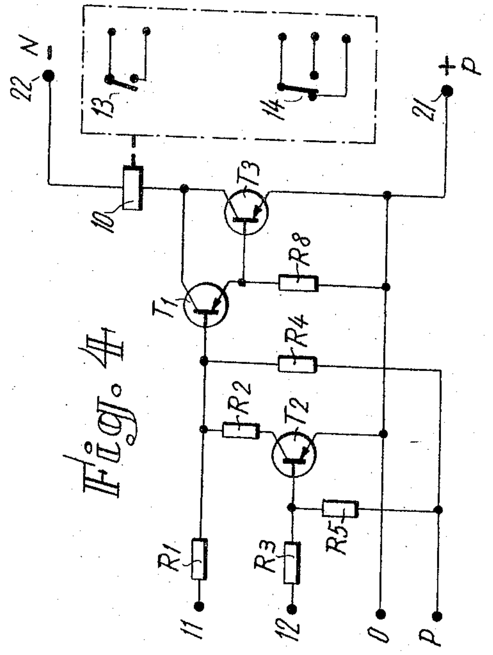
Figure 4A:
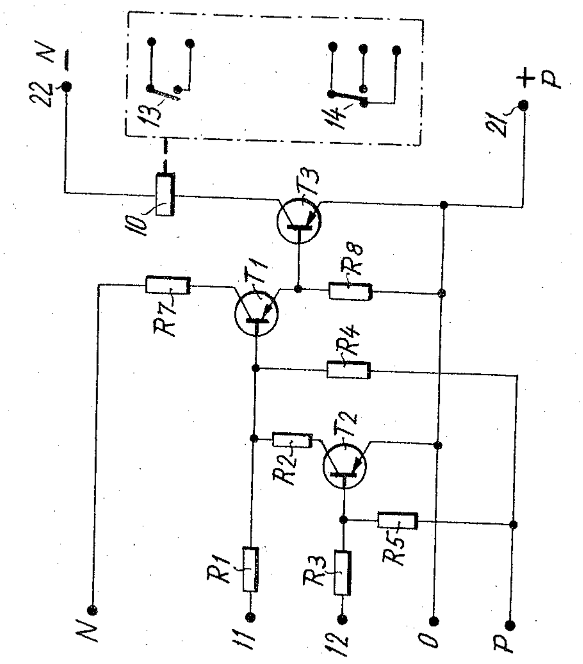
Figure 3A:
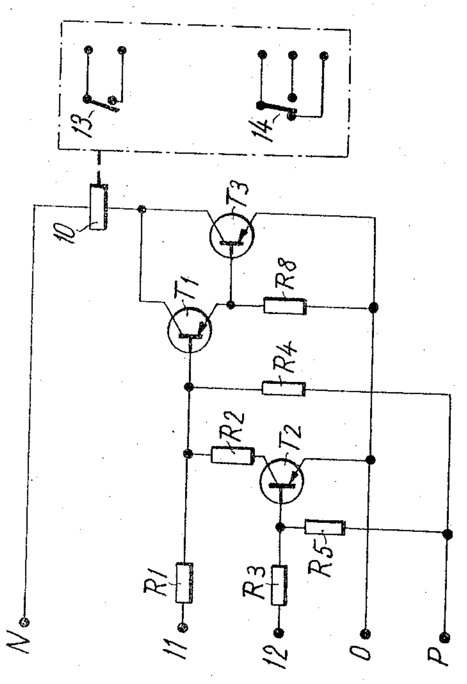
Figure 5:
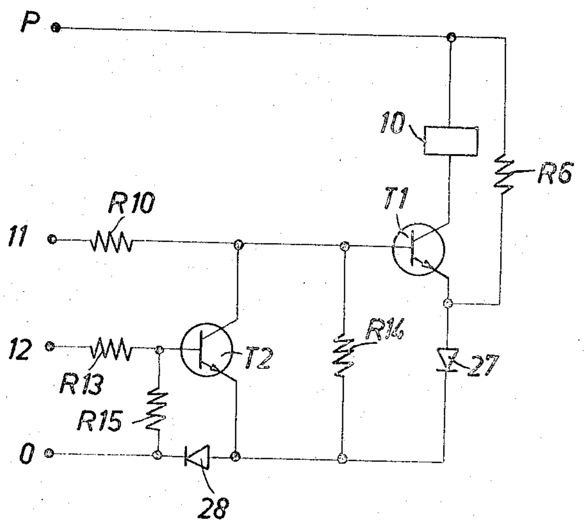

FIG. 3*a* illustrates a further modification of the arrangement according to FIG. 3 including a certain simplification thereof;

FIG. 4 is a further embodiment of the invention which comprises a separate load circuit;

FIG. 4*a* illustrates a modification of the arrangement according to FIG. 4 including a simplification thereof; and FIG. 5 is a schematic circuit diagram illustrating still a further modification of the invention.

Figure 1:
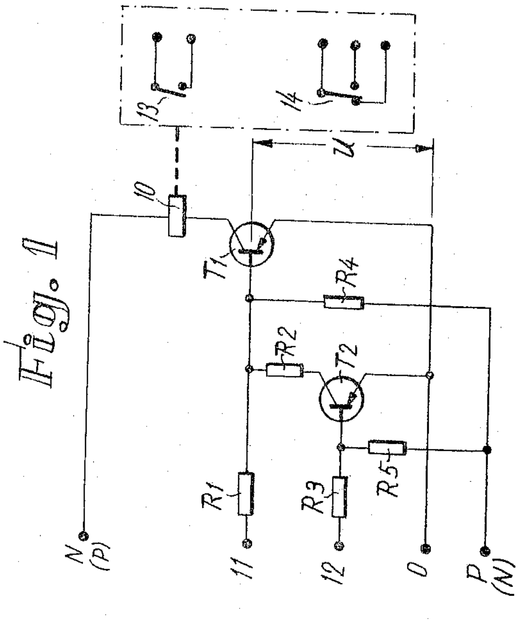
FIG. 1 is a schematic circuit diagram of a basic form of an arrangement according to the invention.

As can be seen, the arrangement according to FIG. 1 comprises two electronic control circuits, each containing a transistor in a common emitter circuit. The first control circuit which may be called the energizing circuit has a control potential input terminal 11 and comprises the first control transistor T1 while the second control circuit which may be called the interrupting circuit comprises the second control potential input terminal 12 and the second control transistor T2. The emitter electrodes of both the first transistor T1 and of the second transistor T2 are connected to a third terminal which carries zero potential. The electromagnetically operable switch device of the arrangement is represented by a coil 10 which actuates when energized relay switch contacts 13 and 14 which are illustrated only by way of example to be a normally open contact and a change-over switch contact, respectively. Evidently, the number and type of contacts operated by the relay coil 10 can be chosen as may be required or desired. The collector of the first transistor T1 is connected via the coil 10 with a first terminal N of a source of direct current voltage which in this example is marked N for indicating that the potential at this point is negative. The base of the first transistor T1 is connected via a resistor R4 with a second terminal of said source which in this example is marked P for indicating that the potential at this point has positive polarity. Of course the polarities at the above-mentioned terminals N and P may have to be reversed as indicated in parentheses depending upon the type of transistor used in the arrangement. A circuit utilizing reversed polarities is indicated in FIG. 5.

The second transistor T2 has its collector electrode connected via a resistor R2 to the base of the first transistor T1 and is connected at its base via a resistor R3 with the above-mentioned second control potential input terminal 12. Additionally, both bases of the transistors T1 and T2 are connected via corresponding resistors R5 and R4 with the above-mentioned terminal P of the source of direct current voltage.

The application of positive potential at the terminal marked P and of negative potential at the terminal marked N presupposes the use of PNP-transistors in the arrangement. If instead NPN-transistors are used then the polarity of the potentials applied to said terminals must be exchanged.

The operation of the arrangement according to FIG. 1 is as follows. In this arrangement, particularly because the transistor bases are connected to the positive terminal both transistors T1 and T2 are normally in non-conductive condition. In particular, there is a moderate positive bias potential U applied to the transistor T1 which keeps this transistor non-conductive in a stable manner. If now a predetermined control potential of negative polarity is applied from an outside source e.g. from a logical circuit or directly from the negative terminal of the above-mentioned source of direct current potential, to the control potential input terminal 11, the voltage differential between emitter and base of the transistor T1 assumes a somewhat negative value and depending upon the current requirement of the coil 10 a corresponding current is caused to flow from the collector of the transistor T1 to the relay coil 10 and from there to the negative terminal N whereby the relay coil 10 is energized and the respective switches 13, 14 are caused to move to their respective second position thus producing the desired swtiching effect.

The relay coil 10 remains energized in this manner as long as the above-mentioned negative potential is applied to the terminal 11. However, if now an impulse of negative polarity is applied also from an outside source e.g. a logical circuit or directly from the negative terminal of the above-mentioned source, to the second input terminal 12 then the second control transistor T2 is rendered conductive in spite of the presence of the positive potential from terminal P at its base, and in this manner the above-mentioned negative voltage differential between emitter and base of the transistor T1 is eliminated. Thus the transistor T1 is rendered non-conductive and the relay coil 10 is accordingly de-energized.

Figure 2:
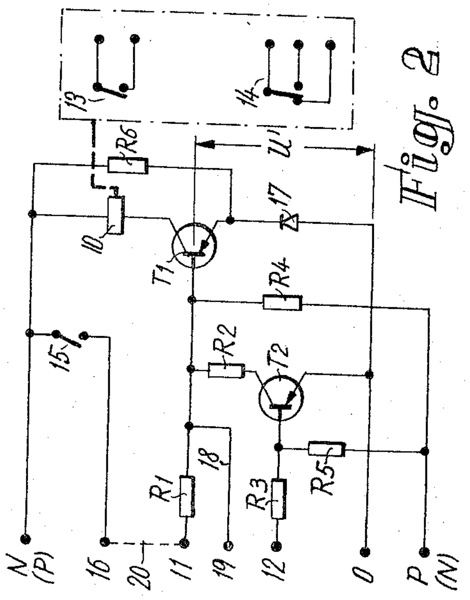
FIG. 2 is a similar diagram illustrating a modified form of the invention.

The modified arrangement according to FIG. 2 differs from the embodiment according to FIG. 1 in two respects. Either one of these two modifications or both simultaneously may be applied. The first difference resides in a further relay contact 15 also operable by energization of the relay coil 10 being connected between the terminal N and an additional terminal 16. Thus this relay contact 15 can be utilized for controlling a device in circuit with the terminal N of the above mentioned source. However, if the terminal 16 is connected by a conductor 20 with the above-mentioned input terminal 11 then the relay contact 15 can be used advantageously for establishing a self-holding circuit for the relay coil 10 because upon energizatoin of the relay coil 10 the resulting closing of the contact 15 will cause the transistor T1 to remain in conductive condition even when the control potential applied from an outside source to the input terminal 11 is no longer applied.

The second difference between the arrangement according to FIG. 2 and that of FIG. 1 consists in the arrangement of a rectifier 17 between the emitter electrodes of the transistors T1 and T2 and of a resistor R6 connected between the emitter of the transistor T1 and the negative terminal N in parallel with the coil 10 and the emitter-collector circuit of the transistor T1. Through this just described arrangement a positive bias potential U′ is applied to the transistor T2 when the above-mentioned negative potential impulse is applied to the second input terminal 12. The positive bias potential U′ corresponds to the voltage drop across the diode 17 in the direction of the current passing therethrough, and thereby it is made absolutely sure that the transistor T1 is rendered non-conductive when said negative impulse is applied to the second input terminal 12.

FIG. 2 also illustrates the above-mentioned feature that a by-pass connection 18 is provided between an additional control terminal 19 and the input line connecting the input terminal 11 with the base of the first transistor T1. Thus, if for any reason the presence of the input resistor R1 is considered unnecessary the energizing input control pulse may be applied not to the normal first input terminal 11 but instead to the additional control input terminal 19.

In general, as far as the various resistors are concerned which are shown in the various circuit diagrams of arrangements according to the invention, for instance the resistors R1–R6, it is to be understood that these resistors are shown only symbolically because in many cases the connections in which these resistors are shown as being inserted may already have themselves the required resistance so that a specific resistor as circuit element can be dispensed with. The examples illustrated and described herein show all the transistors in so-called common emitter arrangement, i.e., the emitters of the transistors are connected to the point carrying zero potential. This type of a circuit arrangement is particularly advantageous and therefore preferred. However the invention can also be embodied in arrangements in which the transistors are arranged in another well known manner e.g. in common collector or base connection.

The arrangement according to FIG. 3 differs from that of FIG. 1 only in that a third transistor T3 is added in a corresponding circuit for the purpose of amplifying the control current furnished by the transistor arrangement. The emitter of the third or amplifying transistor T3 is connected to the point carrying zero potential and thus with the emitter of the first control transisor T1. The base of the amplifying transistor T3 is connected directly with the emitter of the first transistor T1. The relay coil 10 is connected between the collector of the amplifying transistor T3 and the negative terminal N and consequently a resistor R7 is inserted between the collector of the first control transistor T1 and said negative terminal N. A resistor R8 is connected between the emitter of the transistor T1 and a junction point 23 with the zero potential terminal O, the emitter of the amplifying transistor T3 and the emitter of the transistor T2. It can be seen from this diagram that upon application of a control impulse to the input terminal 11 and the resulting effect of rendering the transistor T1 conductive the emitter current of the latter influences the potential at the base of the amplifying transistor T3 and thus causes an amplified collector current to flow from the latter through the relay coil 10. In this manner a relay coil 10 requiring a very considerable energizing current can be controlled by the arrangement. It will be understood that the resistor R7 may also be constituted by a relay coil provided that this relay coil would require a smaller amount of energizing current than the relay coil 10. For instance, the resistor R7 could be replaced by a comparatively small relay coil while the coil 10 could be the energizing coil of an electromagnetic switch.

FIG. 3*a* illustrates a slight simplification of the arrangement according to FIG. 3. As can be seen the only difference is that the resistor R7 is eliminated and instead the collector of the first control transistor T1 is connected directly with the collector of the amplifying transistor T3.

FIG. 4 illustrates a further modification of the basic arrangement according to FIG. 1. As can be seen the collector of the first control transistor T1 is also connected, as in the arrangement according to FIG. 3*a*, with the collector of an amplifying transistor T3. Moreover, the negative terminal N is eliminated as an independent supply terminal and instead negative potential is applied to the terminal 11. Under these circumstances the relay coil 10 is not energized through a current from the above-mentioned outside source of direct current potential. Instead a second independent and separate load circuit is connected to terminals 21 and 22, respectively, between which the emitter-collector circuit of the amplifying transistor T3 and the coil 10 are arranged. Thus this separate load circuit may operate with an entirely different type of electric energy, particularly with a considerably higher voltage than the control circuits mentioned above which are supplied from a previously mentioned outside source of direct current voltage. Consequently with comparatively small control power a relay or switch can be operated which requires a considerably greater power.

FIG. 4*a* finally illustrates a modification of FIG. 3 inasmuch as to the arrangement of FIG. 3 a separate and independent load circuit is added which in the same manner as in FIG. 4 operates the relay coil 10 through the emitter-collector circuit of the amplifier transistor T3.

In FIG. 5, the emitter-base path of the first transistor T1 is connected in parallel with the emitter-collector path of the second transistor T2, as in the embodiment of the preceding figures. In the embodiments of the preceding figures, however, PNP or germanium transistors are especially suitable. Such transistors are sensitive to heat due to temperature increases and do not have sufficient temperature stability.

In the circuit of FIG. 5, increased temperature stability is provided, since silicon transistors or NPN transistors, having greater temperature stability than germanium transistors, may be utilized in the circuit. The modification of FIG. 5 includes the second difference of the modification of FIG. 2 over FIG. 1; that is, the rectifier 27, which is the equivalent of the rectifier 17 of FIG. 2, and the resistor R6, which is the same as the resistor R6 of FIG. 2.

In FIG. 5, the first transistor T1 switches on or energizes the relay coil 10 and the second transistor T2 switches off or deenergizes said relay coil. The relay switches 13 and 14 are not shown in FIG. 5, since they are adequately illustrated in the preceding FIGS. The emitter of the first transistor T1 is connected to the zero potential terminal O via rectifiers or diodes 27 and 28 and the emitter of the second transistor T2 is connected to said terminal via the rectifier 28.

The collector of the first transistor T1 is connected to a terminal P of a source of direct current voltage, which at the terminal P is positive, via the relay coil 10. The base of the first transistor T1 is connected to the first control potential input terminal 11, via a resistor R10 and to the zero potential terminal O via a resistor R14 and the rectifier 28.

The collector of the second transistor T2 is connected to the base of the first transistor T1 and is connected to the first control potential input terminal 11 via the resistor R10. The base of the second transistor T2 is connected to the second control potential terminal 12 via a resistor R13 and to the zero potential terminal O via a resistor R15.

The relay coil 10 and the relay switches 13 and 14 (not shown in FIG. 5, are the same as the relay coil 10 and the relay switches 14 and 13 of the embodiments of the preceding figures and operate in the same manner. A resistor R6, as utilized in the embodiment of FIG. 2, is connected between the emitter of the first transistor T1 and the positive terminal P in parallel with the relay coil 10 and the emitter-collecter path of said transistor.

The rectifier or diode 27 is connected at one terminal to a point common to the emitter of the transistor T1 and the resistor R6, and is connected at its other terminal to a point common to the emitter of the transistor T2 and the rectifier 28. The diode 27 is connected with a polarity which permits it to conduct in a forward direction to the zero potential terminal O.

The rectifier or diode 28 is connected at one terminal to the emitter of the transistor T2 and is connected at its other terminal to a point common to the resistor R15 and the zero potential terminal O. The diode 28 is connected with the same polarity as the diode 27 which permits it to conduct in a forward direction to the zero potential terminal Q.

The diode 27 and the resistor R14 produce a voltage drop across the first transistor T1 to apply a negative biasing potential between the base and the emitter of said transistor. The diode 28 and the resistor R15 produce a voltage drop across the second transistor T2 to apply a negative biasing potential between the base and emitter of said transistor.

The circuit of FIG. 5 functions in essentially the same manner as the circuit of FIG. 1 with the exception of the resistor R6 which functions in the same manner as it does in FIG. 2 and with the exception of the different polarities evident in the circuit and the use of NPN transistors.

The circuit of FIG. 5 and especially the diodes 27 and 28 and the resistors R14 and R15 thereof, enable the use of NPN transistors or silicon transistors, silicon transistors have greater temperature stability than germanium transistors. Although NPN transistors may be utilized in the embodiments of the preceding figures the positive biasing potential on the transistors would considerably reduce the circuit efficiency.

Although various resistors are illustrated in the embodiment of FIG. 5, they may be eliminated if the inherent resistance of the circuit is of a desired magnitude at the locations of such resistors. The embodiment of FIG. 5 may be varied, of course, in the same manner as the embodiment of FIG. 1 is varied in FIGS. 2, 3, 3*a*, 4 and 4*a*. The negative polarity terminal of the source of direct current voltage may be shown in addition to the zero potential terminal O or in place thereof in the manner that the positive polarity terminal is shown in the preceding figures.

By way of example, an embodiment of the invention according to FIG. 1 has been found to operate very satisfactorily on the basis of the following data:

| | | Volts |
|---|---|---|
| Potential between N and O | | 24 |
| Potential between P and O | | 12 |
| Resistance of: | | |
| R1 | Kohms | 18 |
| R2 | ohms | 200 |
| R3 | Kohms | 18 |
| R4 | Kohms | 56 |
| R5 | Kohms | 56 |
| Coil 10 | ohms | 600 |

In the same manner by way of example the corresponding data for a satisfactory operation of an arrangement according to FIG. 3 are the following:

| | | |
|---|---|---|
| R1 | Kohms | 10–18 |
| R2 | ohms | 200 |
| R3 | Kohms | 10–18 |
| R4 | Kohms | 56 |
| R5 | Kohms | 56 |
| R7 | ohms | 600–1500 |
| R8 | ohms | 100–200 |
| Coil 10 | ohms, min. | [1] 5. |

[1] I.e. for clutches or valves.

It should be understood that in the specification and in the claims the term "resistor" is always to be interpreted in such a manner that this term also covers a lead or conductor having a desired resistance, and that "resistor" is not necessarily restricted to a specific resistor unit inserted in the respective connection.

It will be understood that each of the elements described above or two or more together, may also find a useful application in other types of a switching arrangement differing from the types described above.

While the invention has been illustrated and described as embodied in a switching arrangement composed of electromagnetically operable switching means and electronic means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A switching arrangement comprising, in combination, electromagnetically operable switch means including an energizable coil and contact means changeable between predetermined circuit-closing and circuit-opening positions depending upon a change of energization of said coil; first electronic control means including a first transistor having emitter, collector and base electrodes and an emitter-base path and an emitter-collector path, said collector electrode being connected to one end of said coil of said electromagnetically operable switch means for energizing said coil when a predetermined control potential is applied to said base electrode; second electronic control means including a second transistor having emitter, collector and a base electrode, an emitter-base path and an emitter-collector path, the collector electrode of said second transistor being connected to the base electrode of said first transistor for causing said first transistor to discontinue energizing said coil as long as said predetermined potential is applied to the base electrodes of both of said first and second transistors; and circuit means for energizing said coil, for applying said control potential to said electronic control means, and connecting said first and second electronic control means with each other and with said coil in a manner whereby the emitter-base path of said first transistor and the emitter-collector path of said second transistor are connected in parallel, said circuit means including means for applying a direct current potential of predetermined polarity to the other end of said coil, a zero potential terminal having zero potential, first control potential means for applying a first control potential to the base electrode of said first transistor to cause said first transistor to become conductive, second control potential means for applying a second control potential to the base electrode of said second transistor to cause said second transistor to become conductive and thereby to cause the application of said first control potential to the base electrode of said first transistor to become ineffective thereby causing said first transistor to become non-conductive, a first biasing resistor connected between the base electrode of said first transistor and a biasing voltage supply for applying to said first transistor a biasing potential having a polarity opposite to that of said direct current potential, and a second biasing resistor connected between the base electrode of said second transistor and a biasing voltage supply for applying to said second transistor a biasing potential having a polarity opposite to that of said direct current potential.

2. A switching arrangement, comprising, in combination, electromagnetically operable switch means including an energizable coil and contact means changeable between predetermined circuit-closing and circuit-opening positions depending upon a change of energization of said coil; first electronic control means including a first transistor having emitter, collector and base electrodes, and an emitter-base path and an emitter-collector path, said collector electrode being connected to one end of said coil of said electromagnetically operable switch means for energizing said coil when a predetermined control potential is applied to said base electrode; second electronic control means including a second transistor having emitter, collector and base electrodes, an emitter-base path and an emitter-collector path, the collector electrode of said second transistor being connected to the base electrode of said first transistor for causing said first transistor to discontinue energizing said coil as long as said predetermined potential is applied to the base electrodes of both of said first and second transistors; and circuit means for energizing said coil, for applying said control potential to said electronic control means, and connecting said first and second electronic control means with each other and with said coil in a manner whereby the emitter-base path of said first transistor and the emitter-collector path of said second transistor are connected in parallel, said circuit means including means for applying a direct current potential of predetermined polarity to the other end of said coil, a zero potential terminal having zero potential, first control potential means for applying a first control potential to the base electrode of said first transistor to cause said first transistor to become conductive, second control potential means for applying a second control potential to the base electrode of said second transistor to cause said second transistor to become conductive and thereby to cause the application of said first control potential to the base electrode of said first transistor to become ineffective thereby causing said first transistor to become non-conductive, first biasing resistor connected between the base electrode of said first transistor and said zero potential terminal for applying to said first transistor a biasing potential having a polarity opposite to that of said direct current potential, a second biasing resistor connected between the base electrode of said second transistor and said zero potential terminal for applying to said second transistor a biasing potential having a polarity opposite to that of said direct current potential, and a resistor of determined resistance value connected between the emitter electrode of said first transistor and said means for applying a direct current potential in parallel with said coil and the emitter-collector path of said first transistor.

3. A switching arrangement, comprising, in combination, electromagnetically operable switch means including an energizable coil and contact means changeable between predetermined circuit-closing and circuit-opening positions depending upon a change of energization of said coil; first electronic control means including a first transistor having emitter, collector and base electrodes, and an emitter-base path and an emitter-collector path, said collector electrode being connected to one end of said coil of said electromagnetically operable switch means for energizing said coil when a predetermined control potential is applied to said base electrode; second electronic control means including a second transistor having emitter, collector and base electrodes, an emitter-base path and an emitter-collector path, the collector electrode of said second transistor being connected to the base electrode of said first transistor for causing said first transistor to discontinue energizing said coil as long as said predetermined potential is applied to the base electrodes of both of said first and second transistors; and circuit means for energizing said coil, for applying said control potential to said electronic control means, and connecting said first and second electronic control means with each other and with said coil in a manner whereby the emitter-base path of said first transistor and the emitter-collector path of said second transistor are connected in parallel, said circuit means including means for applying a direct current potential of predetermined polarity to the other end of said coil, a zero potential terminal having zero potential, first control potential means for applying a first control potential to the base electrode of said first transistor to cause said first transistor to become conductive, second control potential means for applying a second control potential to the base electrode of said second transistor to cause said second transistor to become conductive and thereby to cause the application of said first control potential to the base electrode of said first transistor to become ineffective thereby causing said first transistor to become non-conductive, a first biasing resistor connected between the base electrode of said first transistor and said zero potential terminal for applying to said first transistor a biasing potential having a polarity opposite to that of said direct current potential, a second biasing resistor connected between the base electrode of said second transistor and said zero potential terminal for applying to said second transistor a biasing potential having a polarity opposite to that of said direct current potential, and a first diode rectifier connected at one terminal to the emitter electrode of said first transistor and at its other terminal to the emitter electrode of said second transistor, said first diode rectifier being connected with a polarity which permits it to conduct in a forward direction from said first transistor to said second transistor.

4. A switching arrangement, comprising, in combination, electromagnetically operable switch means including an energizable coil and contact means changeable between predetermined circuit-closing and circuit-opening positions depending upon a change of energization of said coil; first electronic control means including a first transistor having emitter, collector and base electrodes, and an emitter-base path and an emitter-collector path, said collector electrode being connected to one end of said coil of said electromagnetically operable switch means for energizing said coil when a predetermined control potential is applied to said base electrode; second electronic control means including a second transistor having emitter, collector and base electrodes, an emitter-base path and an emitter-collector path, the collector electrode of said second transistor being connected to the base electrode of said first transistor for causing said first transistor to discontinue energizing said coil as long as said predetermined potential is applied to the base electrodes of both of said first and second transistors; and circuit means for energizing said coil, for applying said control potential to said electronic control means, and connecting said first and second electronic control means with each other and with said coil, in a manner whereby the emitter-base path of said first transistor and the emitter-collector path of said second transistor are connected in parallel, said circuit means including means for applying a direct current potential of predetermined polarity to the other end of said coil, a zero potential terminal having zero potential, first control potential means for applying a first control potential to the base electrode of said first transistor to cause said first transistor to become conductive, second control potential means for applying a second control potential to the base electrode of said second transistor to cause said second transistor to become conductive and thereby to cause the application of said first control potential to the base electrode of said first transistor to become ineffective thereby causing said first transistor to become non-conductive, a first biasing resistor connected between the base electrode of said first transistor and said zero potential terminal for applying to said first transistor a biasing potential having a polarity opposite to that of said direct current potential, a second biasing resistor connected between the base electrode of said second transistor and said zero potential terminal for applying to said second transistor a biasing potential having a polarity opposite to that of said direct current potential, and a first diode rectifier connected at one terminal to the emitter electrode of said first transistor and at its other terminal to the emitter electrode of said second transistor, said first diode rectifier being connected with a polarity which permits it to conduct in a forward direction from said first transistor to said second transistor, and a second diode rectifier connected at one terminal to a point common to said first diode rectifier and the emitter electrode of said second transistor and at its other terminal to said zero potential terminal, said second diode rectifier being connected with a polarity which permits it to conduct in a forward direction from second transistor to said zero potential terminal.

5. A switching arrangement, comprising, in combination, electromagnetically operable switch means including an energizable coil and contact means changeable between predetermined circuit-closing and circuit-opening positions depending upon a change of energization of said coil; first electronic control means including a first transistor having emitter, collector and base electrodes, and an emitter-base path and an emitter-collector path, said collector electrode being connected to one end of said coil of said electromagnetically operable switch means for energizing said coil when a predetermined control potential is applied to said base electrode; second electronic control means including a second transistor having emitter, collector and base electrodes, an emitter-base path and an emitter-collector path, the collector electrode of said second transistor being connected to the base electrode of said first transistor for causing said first transistor to discontinue energizing said coil as long as said predetermined potential is applied to the base electrodes of both of said first and second transistors; and circuit means for energizing said coil, for applying said control potential to said electronic control means, and connecting said first and second electronic control means with each other and with said coil in a manner whereby the emitter-base path of said first transistor and the emitter-collector path of said second transistor are connected in parallel, said circuit means including means for applying a direct current potential of predetermined polarity to the other end of said coil, a zero potential terminal having zero potential, first control potential means for applying a first control potential to the base electrode of said first transistor to cause said first transistor to become conductive, second control potential means for applying a second control potential to the base electrode of said second transistor to cause said second transistor to become conductive and thereby to cause the application of said first control potential to the base electrode of said first transistor to become ineffective thereby causing said first transistor to become non-conductive, first and second diode rectifiers connected in series between the emitter electrode of said first transistor and said zero potential terminal, each of said diode rectifiers being connected with a polarity which permits it to conduct in a forward direction from said first transistor to said zero potential terminal, a first biasing resistor connected between a point common to said first and second diode rectifiers and the base electrode of said first transistor for applying to said first transistor a biasing potential having a polarity opposite to that of said direct current potential, and a second biasing resistor connected between a point common to said second diode rectifier and said zero potential terminal and the base electrode of said second transistor for applying to said second transistor a biasing potential having a polarity opposite to that of said direct current potential, the emitter electrode of said second transistor being connected between said second diode rectifier and the junction of said first diode rectifier and said first biasing register.

6. A switching arrangement as claimed in claim 1, wherein the polarity of said direct current potential is positive and each of said first and second transistors is an NPN type transistor.

7. A switching arrangement as claimed in claim 5, wherein the polarity of said direct current potential is positive and each of said first and second transistors is an NPN type transistor, and further comprising a resistor of determined resistance value connected between a point common to the emitter electrode of said first transistor and said first diode rectifier and said means for applying a direct current potential in parallel with said coil and the emitter-collector path of said first transistor.

8. A switching arrangement as defined in claim 1 including a diode connected between the emitters of said first and second transistors and a third resistor connected between the emitter of said first transistor and the other end of said coil for increasing the reliability of operation of said arrangement.

9. A switching arrangement as defined in claim 1 including a third transistor actuated by said first transistor and operating said coil, said third transistor being amplifying means for amplifying the signal from said first transistor and assure reliable operation of said coil thereby.

References Cited by the Examiner

UNITED STATES PATENTS

| | | | |
|---|---|---|---|
| 3,020,413 | 2/1962 | Hamelink | 317—33 X |
| 3,058,036 | 10/1962 | Reuther et al. | 307—88.5 |
| 3,122,697 | 2/1964 | Kauders. | |

FOREIGN PATENTS

| | | |
|---|---|---|
| 1,083,396 | 6/1960 | Germany. |
| 1,117,396 | 11/1961 | Germany. |

MILTON O. HIRSHFIELD, *Primary Examiner.*

LEE T. HIX, *Examiner.*

UNITED STATES PATENT OFFICE
CERTIFICATE OF CORRECTION

Patent No. 3,307,082 February 28, 1967

Gerog Riedmayr

It is hereby certified that error appears in the above numbered patent requiring correction and that the said Letters Patent should read as corrected below.

In the heading to the printed specification, line 3, for "Georg Reidmayr" read -- Georg Riedmayr --; lines 3 and 4, for "Carl Murth Maschinen -und Zahnradfabrik" read -- Carl Hurth Maschinen -und Zahnradfabrik --.

Signed and sealed this 27th day of August 1968.

(SEAL)
Attest:

Edward M. Fletcher, Jr.
Attesting Officer

EDWARD J. BRENNER
Commissioner of Patents